US012670068B2

(12) United States Patent
Fedorov

(10) Patent No.: US 12,670,068 B2
(45) Date of Patent: Jun. 30, 2026

(54) SYSTEM AND METHOD OF ENCODING DATA FOR PERFORMING VECTOR CALCULATIONS IN RAID STORAGE SYSTEMS

(71) Applicant: Andrey Fedorov, Haifa (IL)

(72) Inventor: Andrey Fedorov, Haifa (IL)

( * ) Notice: Subject to any disclaimer, the term of this patent is extended or adjusted under 35 U.S.C. 154(b) by 15 days.

(21) Appl. No.: 18/666,746

(22) Filed: May 16, 2024

(65) Prior Publication Data

US 2024/0394144 A1 Nov. 28, 2024

Related U.S. Application Data

(60) Provisional application No. 63/500,014, filed on May 4, 2023.

(51) Int. Cl.
*G06F 11/10* (2006.01)

(52) U.S. Cl.
CPC ...... *G06F 11/1076* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 7,660,966 | B2 * | 2/2010 | Strange | G06F 11/1092 711/209 |
| 9,026,729 | B1 * | 5/2015 | Hallak | G06F 11/108 711/114 |
| 9,086,992 | B1 * | 7/2015 | Briggs | H03M 13/05 |
| 9,760,439 | B2 * | 9/2017 | Anderson | G06F 3/0619 |
| 2006/0123271 | A1 * | 6/2006 | Forhan | G06F 11/1076 714/6.32 |
| 2013/0124776 | A1 * | 5/2013 | Hallak | G06F 11/1008 711/E12.008 |
| 2014/0006850 | A1 * | 1/2014 | Aliev | G06F 11/2053 714/6.24 |
| 2020/0125444 | A1 * | 4/2020 | Swamy | G06F 12/10 |
| 2020/0192758 | A1 * | 6/2020 | Pletka | G06F 3/0665 |

OTHER PUBLICATIONS

A. Luntovskyy and J. Spillner, "RAIC Integration for Network Storages on Mobile Devices," 2013 Seventh International Conference on Next Generation Mobile Apps, Services and Technologies, Prague, Czech Republic, 2013, pp. 142-147, (Year: 2013).*
H. Ohtsuji and O. Tatebe, "Active Storage Mechanism for Cluster-Wide RAID System," 2015 IEEE International Conference on Data Science and Data Intensive Systems, Sydney, NSW, Australia, 2015, pp. 25-32, (Year: 2015).*
P. Sobe and K. Peter, "Comparison of Redundancy Schemes for Distributed Storage Systems," Fifth IEEE International Symposium on Network Computing and Applications (NCA'06), Cambridge, MA, USA, 2006, pp. 196-203, (Year: 2006).*

* cited by examiner

*Primary Examiner* — Daniel F. McMahon
(74) *Attorney, Agent, or Firm* — Mestechkin Law Group P.C.

(57) ABSTRACT

The technology described herein involves encoding data representing an array of finite field elements for performing calculations when creating RAID storage systems, characterized in that the bits encoding each element of the Galois field are not arranged sequentially, one after the other, but in increments of n bits, where n>1.

10 Claims, 9 Drawing Sheets

900

904

RAID CONTROLLER

Network

906

RAID DISK ARRAY

902

SERVER

604

600

Modulo: $x^8 + x^5 + x^3 + x + 1$

602

Vector register

Step 1. Rotation

Step 2. XOR

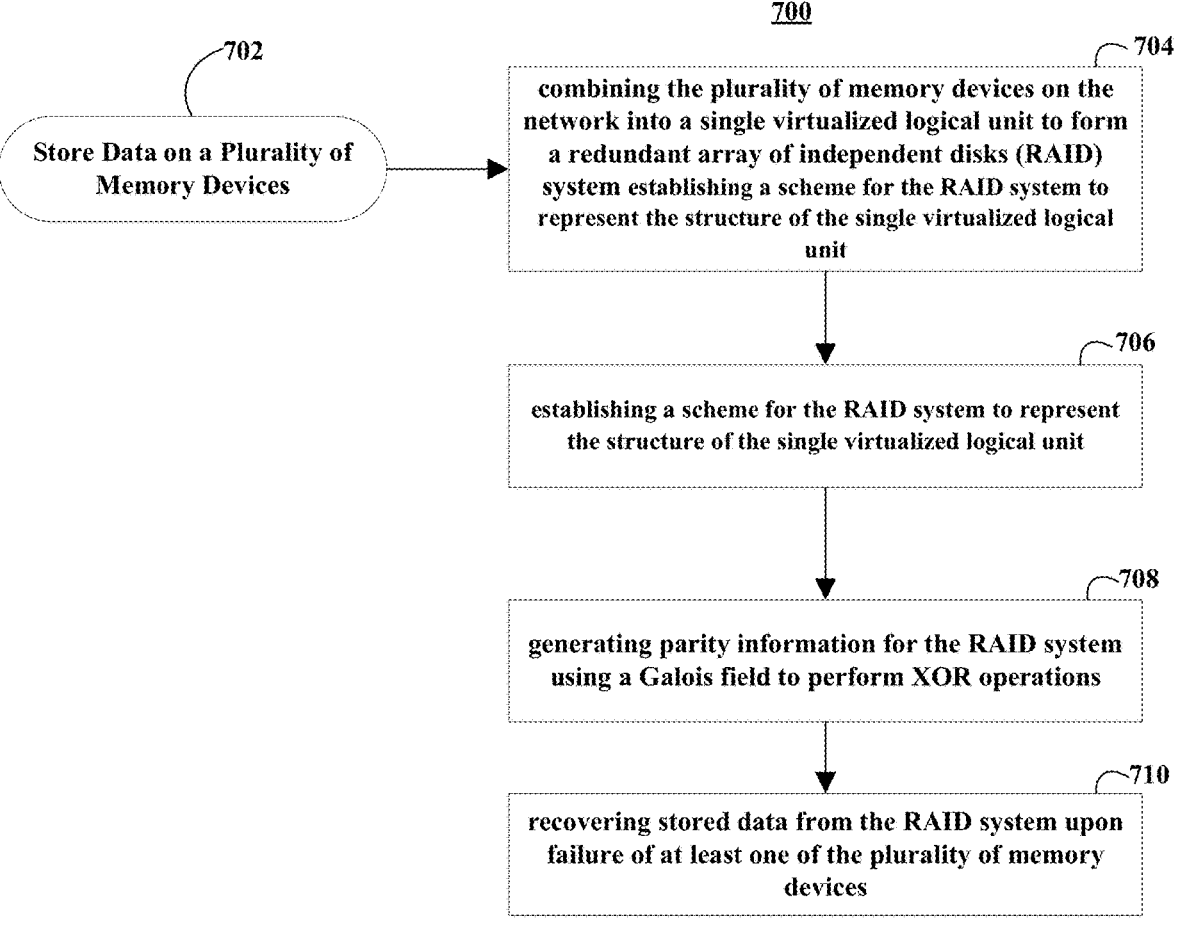

700

702

Store Data on a Plurality of Memory Devices

704 combining the plurality of memory devices on the network into a single virtualized logical unit to form a redundant array of independent disks (RAID) system establishing a scheme for the RAID system to represent the structure of the single virtualized logical unit

706 establishing a scheme for the RAID system to represent the structure of the single virtualized logical unit

708 generating parity information for the RAID system using a Galois field to perform XOR operations

710 recovering stored data from the RAID system upon failure of at least one of the plurality of memory devices

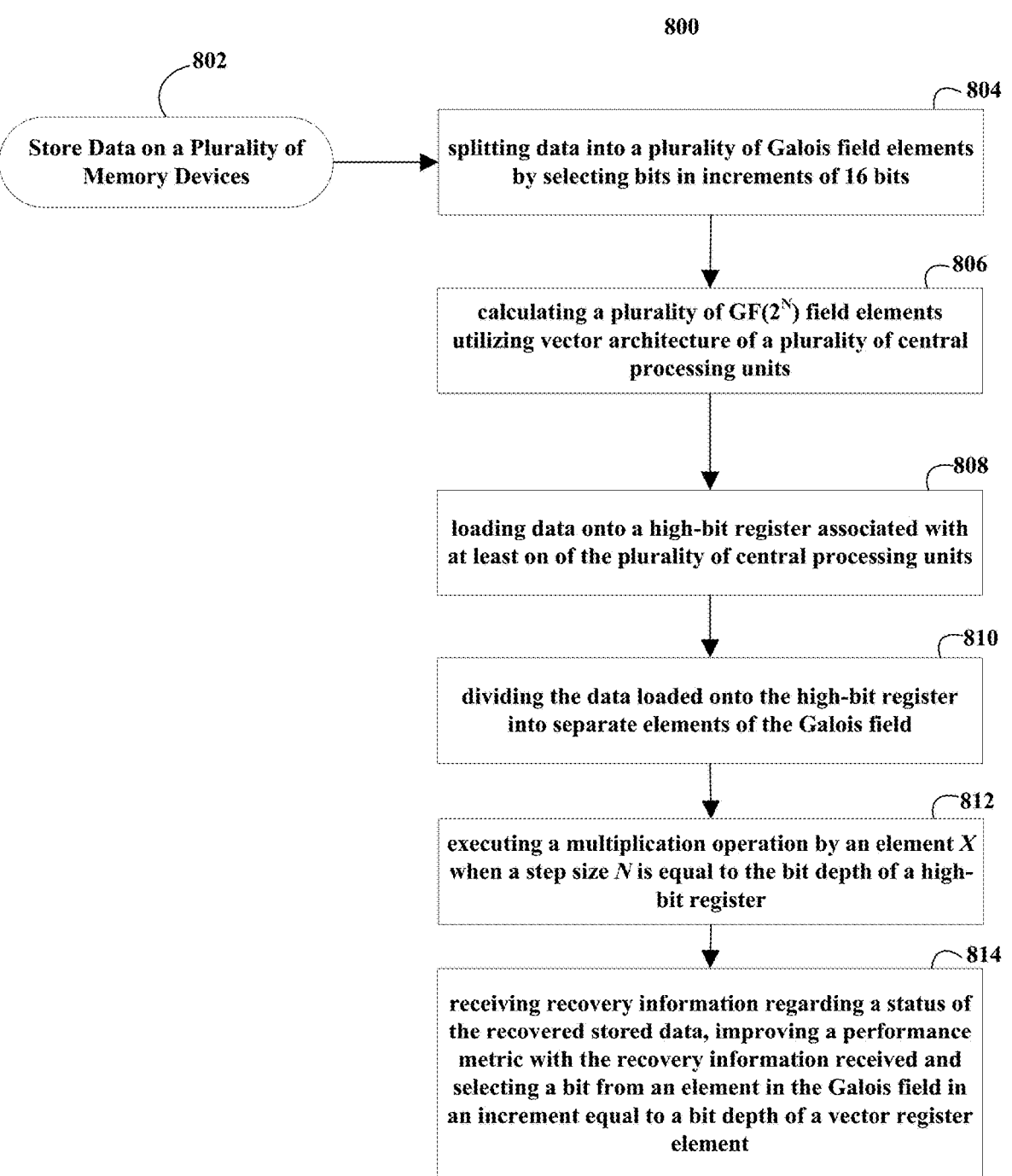

802

Store Data on a Plurality of
Memory Devices

804 splitting data into a plurality of Galois field elements
by selecting bits in increments of 16 bits

806 calculating a plurality of GF($2^N$) field elements
utilizing vector architecture of a plurality of central
processing units

808 loading data onto a high-bit register associated with
at least on of the plurality of central processing units

810 dividing the data loaded onto the high-bit register
into separate elements of the Galois field

812 executing a multiplication operation by an element $X$
when a step size $N$ is equal to the bit depth of a high-
bit register

814 receiving recovery information regarding a status of
the recovered stored data, improving a performance
metric with the recovery information received and
selecting a bit from an element in the Galois field in
an increment equal to a bit depth of a vector register
element

Fig. 8

SYSTEM AND METHOD OF ENCODING DATA FOR PERFORMING VECTOR CALCULATIONS IN RAID STORAGE SYSTEMS

RELATED APPLICATIONS

This application claims priority to U.S. Provisional Patent Application No. 63/500,014 filed May 4, 2023, entitled "System And Method For Checksum Calculations In Raid Based On Advanced Vector Extensions And Multithreading," which is hereby incorporated by reference in its entirety.

BACKGROUND OF THE INVENTION

RAID, which stands for Redundant Array of Independent Disks, is a technology used to enhance the performance, reliability, and/or availability of data storage systems. It achieves this by distributing or replicating data across multiple drives, creating a single logical unit. RAID systems are widely used in servers, enterprise storage solutions, and even in some high-end personal computers. The primary goals of RAID include data redundancy, increased performance, or a combination of both. By spreading data across multiple drives, RAID can improve read and write performance, as well as provide fault tolerance against drive failures.

There are several different RAID levels, each offering a unique combination of performance, fault tolerance, and storage efficiency. Some common RAID levels include: RAID 0: Also known as striping, RAID 0 distributes data evenly across multiple drives without redundancy. It offers improved performance for read and write operations but provides no fault tolerance. If one drive fails, all data is lost. RAID 1: Known as mirroring, RAID 1 duplicates data across multiple drives, providing redundancy. If one drive fails, data remains accessible from the mirrored drive(s). However, it doesn't offer performance improvements since data is written to each drive independently. RAID 5: RAID 5 stripes data across multiple drives like RAID 0 but includes parity information for fault tolerance. Parity allows the system to rebuild lost data if one drive fails. RAID 5 requires a minimum of three drives and offers a good balance of performance and redundancy.

RAID 6: Similar to RAID 5, RAID 6 includes dual parity, which provides fault tolerance even if two drives fail simultaneously. This extra redundancy comes at the cost of reduced usable storage capacity.

RAID 10 (or RAID 1+0): RAID 10 combines mirroring and striping. It requires at least four drives and offers both performance improvements and fault tolerance. Data is mirrored across sets of drives, and then those sets are striped together.

SUMMARY OF THE INVENTION

The present invention is directed to the method of encoding data representing an array of finite field elements for performing calculations when creating RAID storage systems, characterized in that the bits encoding each element of the Galois field are not arranged sequentially, one after the other, but in increments of n bits, where n>1.

A method of encoding data for performing vector calculations in a storage system may include storing data on a plurality of memory devices on a network and combining the plurality of memory devices on the network into a single virtualized logical unit to form a redundant array of independent disks (RAID) system. The method may further include establishing a scheme for the RAID system to represent the structure of the single virtualized logical unit. In one embodiment, the process may generate parity information for the RAID system using a Galois field to perform XOR operations. The process may further include recovering stored data from the RAID system upon failure of at least one of the plurality of memory devices.

In one embodiment, the Galois field for encoding data is of the form $GF(2^N)$. The method of encoding data may include a scheme for RAID is RAID 5, RAID 6, RAID 10 (RAId 1+0), RAID 50, RAID 60. and any other known RAID configurations. According to one embodiment, the method of encoding data may include splitting data into a plurality of Galois field elements by selecting bits in increments of n bits. Calculating a plurality of $GF(2^N)$ field elements utilizing vector architecture of a plurality of central processing units, loading data onto a high-bit register associated with at least one of the plurality of central processing units and/or dividing the data loaded onto the high-bit register into separate elements of the Galois field.

The method may include executing a multiplication operation by an element x when a step size n is equal to the bit depth of a high-bit register. In one embodiment, the process may include receiving recovery information regarding a status of the recovered stored data and improving a performance metric with the recovery information received. According to one embodiment, the method may include selecting a bit from an element in the Galois field in an increment equal to a bit depth of a vector register element.

Additional aspects of the present invention will be apparent in view of the description which follows.

BRIEF DESCRIPTION OF THE FIGURES

FIG. 7 illustrates a flow diagram according to one embodiment of this invention.

FIG. 8 illustrates a flow diagram according to one embodiment of this invention.

DETAILED DESCRIPTION OF THE INVENTION

Figure 1:
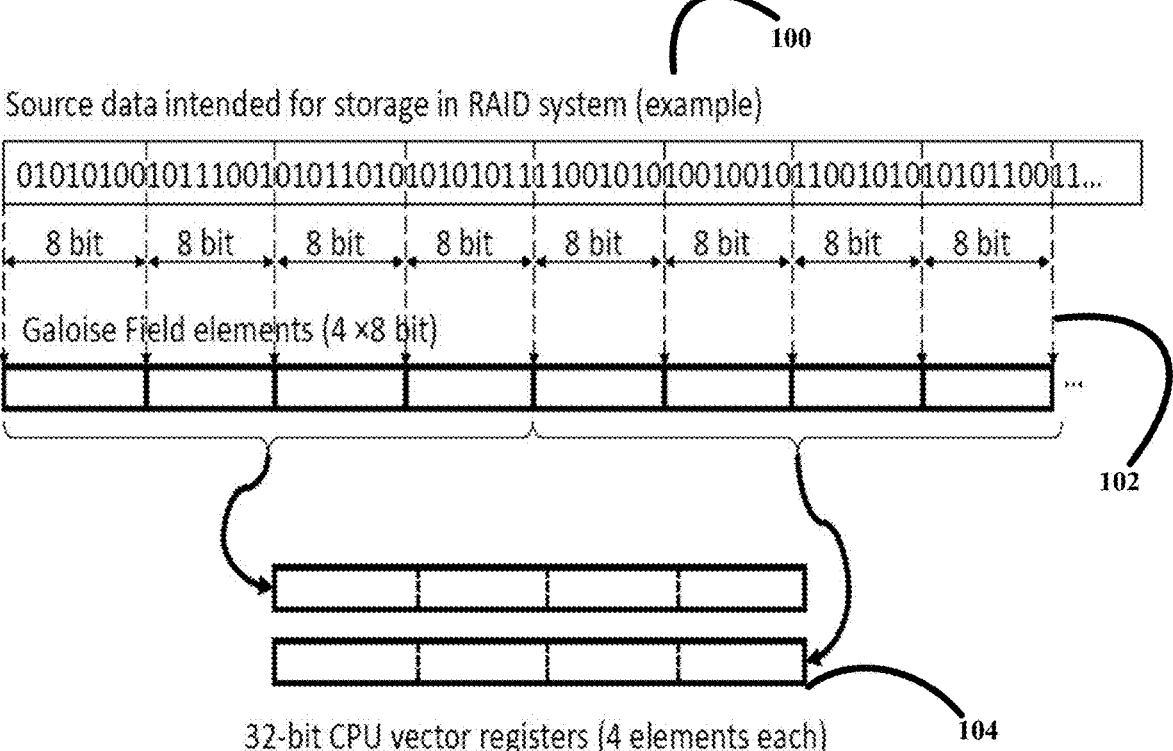
FIG. 1 illustrates source data intended for storage in accordance with this invention.

The present invention is described in the following examples, which are set forth to aid in the understanding of the invention, and should not be construed to limit in any way the scope of the invention as defined in the claims which follow thereafter.

RAID technologies are used in data storage systems to ensure high performance and high reliability of storage. To ensure stability against failures of multiple drives, the RAID system uses finite field arithmetic (Galois fields).

In general, Galois fields, often denoted as $GF(q^N)$, where "q" is a prime power, play a significant role in RAID systems, particularly in those employing RAID levels that use parity information for fault tolerance, such as RAID 5 and RAID 6. These fields are useful for performing the mathematical calculations involved in generating and reconstructing parity data. In RAID systems, parity information is used to provide redundancy, allowing the system to recover data if one or more drives fail. Currently, q=2 is used. Then parity data is calculated using bitwise XOR operations across corresponding bits of data blocks stored on multiple drives. Galois fields provide the mathematical framework for these XOR operations.

As noted above, Galois fields provide a set of mathematical rules for performing addition and multiplication operations on elements within the field. In the context of RAID, these operations are used to calculate parity data. In RAID 5, for example, parity data is calculated by performing bitwise XOR operations across corresponding bits of data blocks stored on multiple drives. In one embodiment, Galois field arithmetic is used to perform these XOR operations efficiently.

When a drive fails in a RAID system, the data on that drive needs to be reconstructed using the remaining data and parity information. Galois field arithmetic enables the system to accurately reconstruct the lost data by performing XOR operations involving the remaining data and parity blocks. Galois fields may also facilitate error detection and correction mechanisms in RAID systems. By analyzing parity information using Galois field arithmetic, the system can detect errors or inconsistencies in the stored data and take corrective actions to maintain data integrity.

In one embodiment, Galois fields of the form $GF(2^N)$ may be used, where most often N=8. To perform calculations, the stored data is represented as arrays of Galois field elements. Each element of the $GF(2^N)$ field is encoded with a word of length n bits.

Since calculations with various field elements are independent of each other, they are performed in parallel using the vector architecture of modern CPUs and/or computing devices. Vector architecture in modern CPUs refers to a design approach that enables simultaneous execution of multiple operations on sets of data elements known as vectors. This architecture is particularly effective for tasks involving repetitive computations or data parallelism, such as multimedia processing, scientific simulations, and machine learning algorithms. There exist a few components of vector architecture in modern CPUs.

The first component of vector architecture is vector registers. Modern CPUs include specialized registers known as vector registers, which can hold multiple data elements (e.g., integers or floating-point numbers) as a single vector. These registers are wider than traditional scalar registers, allowing them to store multiple data elements in parallel. The second component of vector architecture is vector instructions. CPUs with vector architecture support instructions specifically designed to operate on vectors stored in vector registers. These instructions perform the same operation on multiple data elements simultaneously, exploiting data parallelism to improve performance. Common vector instructions include addition, multiplication, division, and bitwise operations. The third component of vector architecture is vector processing units. Vector architecture CPUs include dedicated processing units, often referred to as vector units or vector pipelines, responsible for executing vector instructions efficiently. These units are optimized for parallel computation and typically include multiple execution lanes to process multiple vector elements simultaneously. The fourth component of vector architecture is SIMD (Single Instruction, Multiple Data). Vector architecture is a form of SIMD processing, where a single instruction operates on multiple data elements simultaneously. SIMD instructions enable significant performance improvements by reducing instruction overhead and exploiting parallelism within data sets. The fifth component of vector architecture is compiler support. Vector architecture compilers may generate optimized code that efficiently utilizes vector instructions. Modern compilers include optimizations to automatically vectorize code, transforming scalar operations into vector operations where possible. The sixth component of vector architecture is memory alignment. Efficient use of vector instructions may recognize that data be aligned in memory to match the size of vector registers. CPUs may include features such as memory alignment requirements or cache alignment optimizations to ensure efficient vector processing. By leveraging these components, vector architecture offers substantial performance benefits for workloads that can be parallelized, as it allows for the simultaneous processing of multiple data elements. By executing multiple operations in parallel, vector processing can significantly reduce the time required to perform computations compared to scalar processing.

As noted above, modern processors have specialized high-bit registers, which are divided into separate words. The data that may be calculated is loaded onto these registers and automatically divided into separate elements of the Galois field. The data is read sequentially, that is, the order of the bits in memory coincides with their order on the registers, and thus in each element of the Galois field.

If the processor has vector calculation commands in finite fields, then they are used to perform the necessary calculations. Otherwise, these commands are combined from the available vector commands, such as bitwise shifts and logical operations. In both cases, the field elements are words composed of data bits sequentially located in memory.

FIG. 1 illustrates a method 100 for splitting data into Galois field elements for performing vector calculations. For example, we consider a field $GF(2^8)$, in which each element of the field is represented by 8 bits 101. The data to be represented as an array of $GF(2^8)$ elements is divided into words of 8 bits each and in this form is loaded onto the vector registers 103 of the computing device for calculations.

Figure 2:
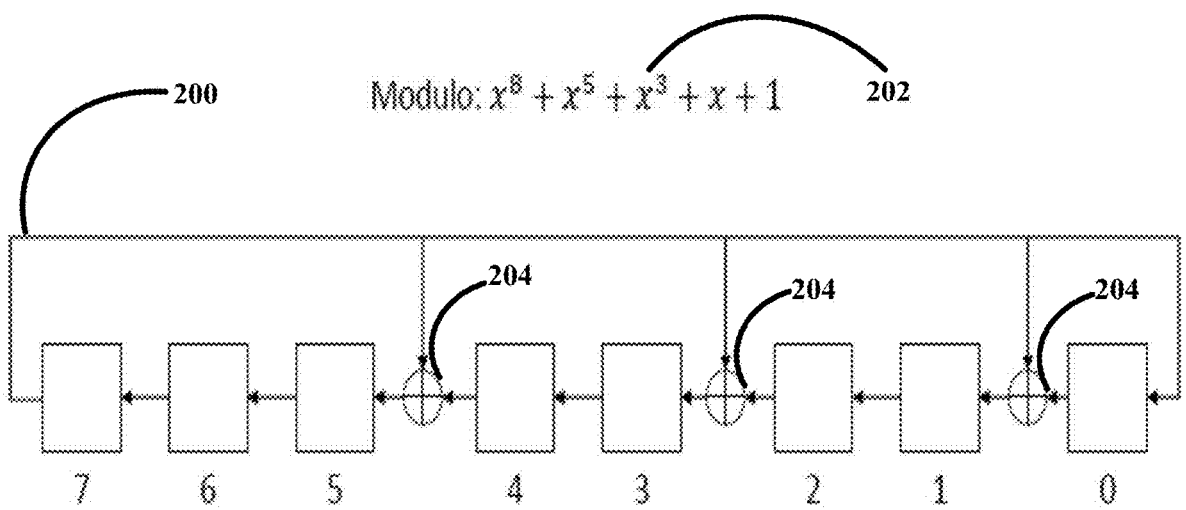
FIG. 2. Illustrates an operation of multiplying by the polynomial x when calculating in Galois fields in accordance with this invention.

FIG. 2 illustrates one of the operations 200_when calculating in Galois fields: multiplication by the polynomial x 202. This operation may be used in solving problems of erasure coding. It may be depicted as a cyclic shift register with feedback, where the feedback is determined by a polynomial modulo which the finite field is constructed. The $x^8+x^5+x^3+x+1$ polynomial is chosen as a demonstration example. The 8-bit register, on which an arbitrary element of the Galois field is placed, performs a cyclic shift 204 to the left. In this case, the digits 5, 3, 1 are added (XOR) of the highest digit. The numbers of these digits correspond to the powers of the nonzero terms of the polynomial modulo which the field is constructed (excluding the highest and lowest bits).

Figure 3:
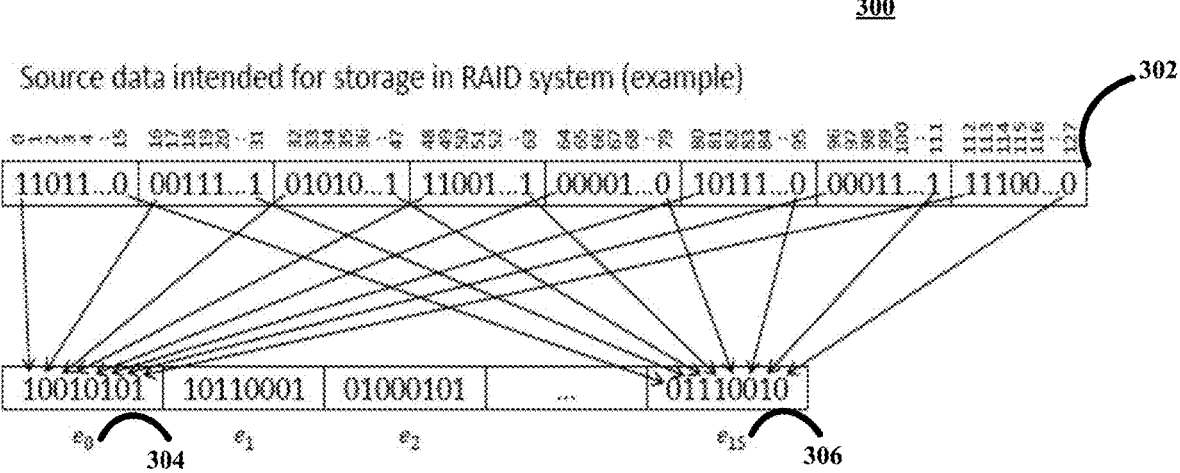
FIG. 3 illustrates the method of splitting data into Galois field elements in accordance with this invention.

FIG. 3 illustrates the method 300_of splitting data into Galois field elements in accordance with this invention. For the purposes of this example, to compose each element of the $GF(2^8)$ field, bits are selected in increments of 16 from the original data array 302. So, the zero element $e_0$ is formed from bits numbered 0, 16, 32, 48, 64, 80, 96 and 112. The first element $e_1$ 304 consists of bits numbered 1, 17, 33, 49, 65, 81, 97 and 113. And so on. The last, fifteenth element $e_{15}$ 306 consists of bits 15, 31, 47, 63, 79, 95, 111 and 127.

Figure 4:
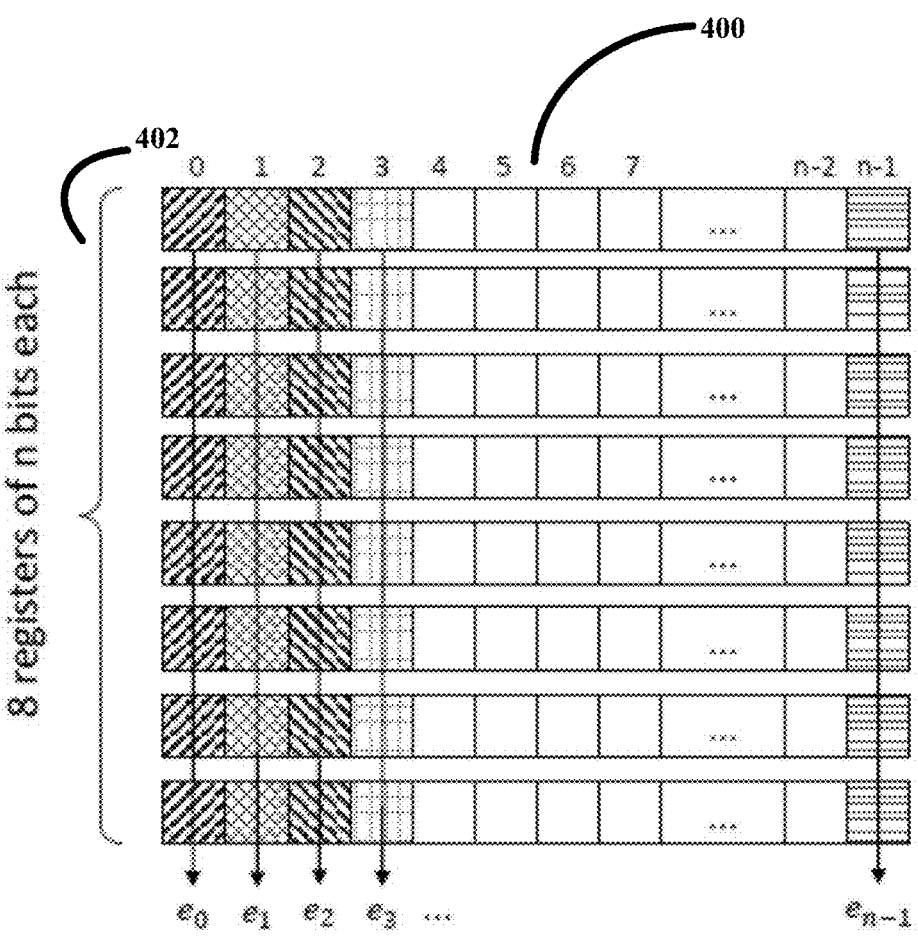
FIG. 4 illustrates the location of the elements of the Galois field on the registers of the computing device

FIG. 4 illustrates the location 400 of the Galois field elements on the registers 402 of the computing device in the case when the step n with which the bits of each element are selected is equal to the bit depth of the register. If 8 bits are needed to encode one field element ($GF(2^8)$), then n field elements are placed on 8 registers of the computing device. Each element of the field consists of bits of different registers with the same numbers. So, element $e_0$ with number 0 is composed of bits with number 0 of all 8 registers. In general, when using fields of the type $GF(2^N)$, it is helpful to use N registers of the computing device, each of which has a bit depth of n.

Figure 5:
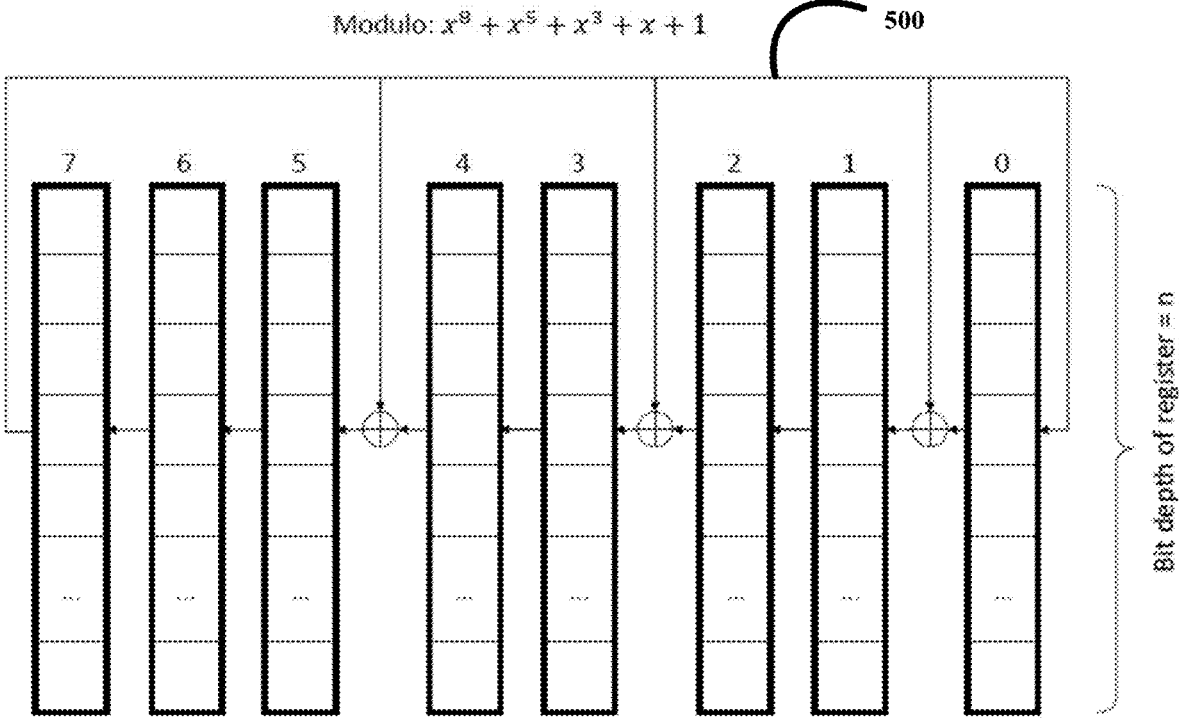
FIG. 5 illustrates the execution of a vector multiplication operation by an element x in accordance with this invention.

FIG. 5 illustrates the execution of a vector multiplication operation 500 by an element x in accordance with this invention in the case when the step size n when selecting a field element is equal to the bit depth of the registers of the computing device. The difference from the scheme shown in FIG. 2 is that the shift and addition are performed not separately with each bit, but simultaneously with all the bits of the register of the computing device.

Similarly, calculations can be organized in the case when the step with which the bits are selected to form each element of the field is not equal, but is a multiple of the bit depth of the register of the computing device.

When building a RAID, the XOR operation is used to calculate one of the syndromes, which is an addition operation in the $GF(2^N)$. A syndrome typically refers to the parity information generated by certain RAID levels, particularly RAID levels that utilize parity for redundancy such as RAID 3, RAID 4, RAID 5, and RAID 6. In RAID systems that use parity, data is spread across multiple drives along with additional parity information. This parity information is used to rebuild lost data in case of drive failure. The syndrome may refer to the specific combination of data and parity bits generated by the RAID controller during the writing process. When data is written to the array, the RAID controller calculates parity information based on the data being written and stores it on one or more drives, depending on the RAID level. This parity information, along with the data, forms the syndrome associated with that particular set of data. During a drive failure, the RAID controller can use the stored parity information (syndrome) along with the remaining data on other drives to reconstruct the lost data and restore redundancy to the array.

To calculate the second and all subsequent syndromes it is necessary to use the multiplication operation in this field. These calculations can be performed in vector form using this invention.

So, for example, the calculation of the second syndrome can be performed using multiplication by the element x, which is discussed above using formula:

$Q=(((D_0 x+D_1)x+D_2)x+\ldots+D_{N-2})x+D_{N-1}$, where Q is the syndrome vector, $D_0 \ldots D_{N-1}$ are data vectors, N is the number of data drives in the RAID array When calculating the third and subsequent vector syndromes, the multiplication operation by elements of the form $x^n$ can be used, which are obtained from the element x in a trivial way ($x^2=x\cdot x$, $x^3=x\cdot x\cdot x$, etc.)

Figure 6:
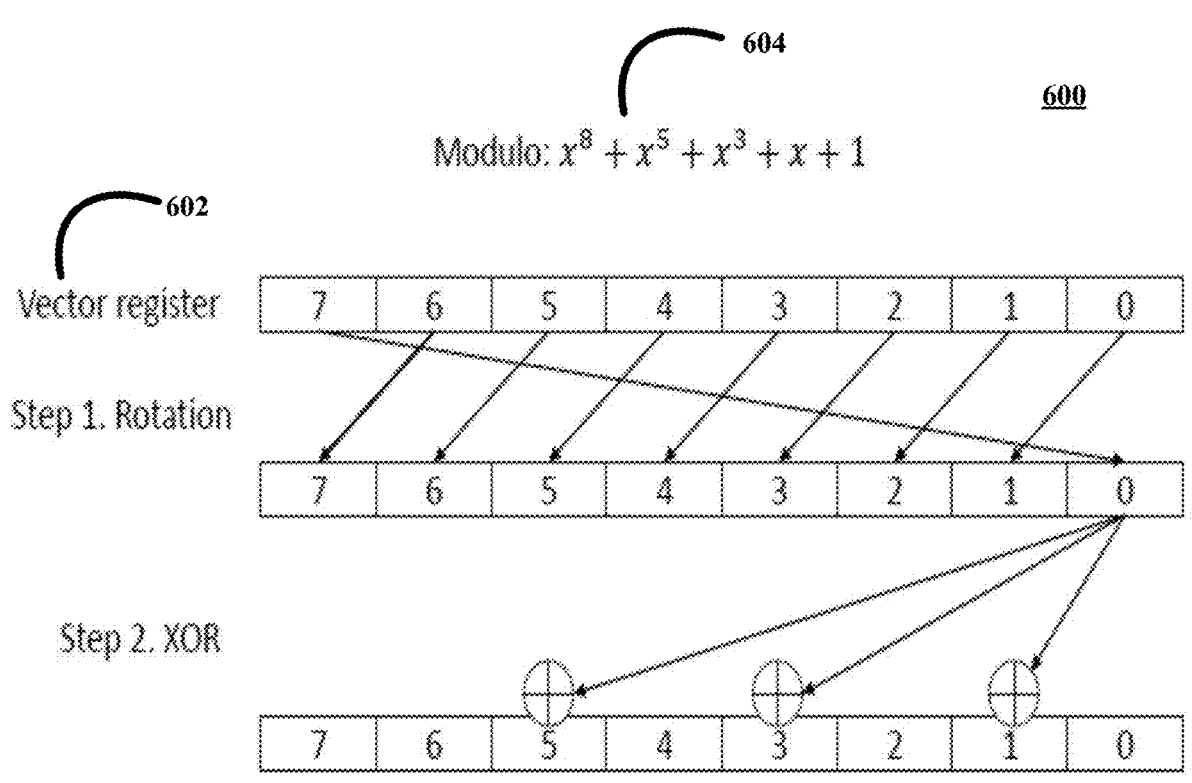
FIG. 6 illustrates the location of the elements of the Galois field on the vector registers of the computing device and a vector multiplication operation by an element x.

FIG. 6 illustrates another special case 600 of encoding, when each bit of an element of the Galois field is selected from memory in increments equal to the bit depth of one element of the vector register 602. In this case, multiplication by the polynomial x 604 can be performed in two steps. The first step is a cyclic shift of the vector register by 1 element. This step can be performed by the shuffle command or in another way. In the second step, the lowest element of the vector register must be added to the elements corresponding to the nonzero coefficients of the generating polynomial.

When recovering data from a lost drive (and also in any other case), a vector multiplication operation by an arbitrary field element may be required. This operation may consist of vector operations of addition and multiplication by a polynomial x using a known Horner scheme or other methods convenient for implementation on a computing device of the selected architecture using the present invention.

FIG. 7 illustrates a flow diagram 700 according to one embodiment of the invention. According to one embodiment, data may be stored on a plurality of memory devices 702. The plurality of memory devices may be combined on a network into a single virtualized logical unit to form a redundant array of independent drives (RAID) system 704. The flow diagram illustrates establishing 706 a scheme for the RAID system to represent the structure of the single virtualized logical unit. The scheme may be RAID 5, RAID 6, RAID 10, RAID 50 and/or RAID 60. In RAID 5, data is striped across multiple drives, and parity information is distributed across all drives. RAID 5 offers a balance between performance and redundancy as it can withstand the failure of one drive without data loss, but requires a minimum of three drives. RAID 6 is similar to RAID 5 but with dual parity, providing fault tolerance even if two drives fail simultaneously. RAID 6 Offers higher fault tolerance compared to RAID 5 and requires a minimum of four drives.

RAID 10 (RAID 1+0) combines RAID 1 (mirroring) and RAID 0 (striping). In RAID 10, data is mirrored across sets of drives, and then those sets are striped together. RAID 10 offers both high performance and redundancy and requires a minimum of four drives. RAID 50 combines RAID 5 and RAID 0. In RAID 50, data is striped across multiple RAID 5 arrays. RAID 50 provides a balance between performance and redundancy and requires a minimum of six drives. RAID 60 is similar to RAID 50 but with dual parity for each RAID 5 array. RAID 60 provides higher fault tolerance compared to RAID 50 and requires a minimum of eight drives.

In one embodiment, the process 700 may include generating parity information 708 for the RAID system using a Galois field to perform XOR operations. Additionally, the process 700 may include recovering 710 stored data from the RAID system upon failure of at least one of the plurality of memory devices.

FIG. 8 illustrates a flow diagram 800 according to one embodiment of the invention. According to one embodiment, the process may include splitting data into a plurality of Galois field elements by selecting bits in increments of n bits 804. The process may further include calculating a plurality of $GF(2^N)$ field elements utilizing vector architecture of a plurality of central processing units 806. The flow diagram illustrates loading data 808 onto a high-bit register associated with at least one of the plurality of central processing units. As illustrated in FIG. 8, the process 800 may include dividing the data loaded onto the high-bit register into separate elements of the Galois field 810. Additionally, the process 800 may execute a multiplication operation by an element X when a step size N is equal to the bit depth of a high-bit register 812. In one embodiment, the process may receive recovery information regarding a status of the recovered stored data, improving a performance metric with the recovery information received and selecting a bit from an element in the Galois field in an increment equal to a bit depth of a vector register element 814.

Improving performance in RAID systems may be accomplished in a variety of ways. One option to select appropriate hardware, high-performance RAID controllers and drives may ensure that the RAID controller has sufficient processing power and cache memory to handle data efficiently. Additionally, fast and reliable hard drives or SSDs with high read/write speeds and low latency may improve the hardware performance of RAID systems.

A second manner to improve performance includes drive configuration. In one embodiment, drive configuration may include optimizing drive layout and placement to maximize data access speed and/or distributing data evenly across drives to balance the workload. Additionally, drive configuration may include using multiple drive channels and interfaces to minimize bottlenecks. For example, spreading drives across multiple RAID controllers or interfaces (e.g., SATA, SAS, NVMe). A third approach to improving performance in a RAID system is optimizing RAID Stripe Size. For example, stripe size (also known as the stripe width or block size) may be adjusted based on workload characteristics and access patterns. Larger stripe sizes can improve sequential read/write performance, while smaller stripe sizes are better suited for random access. A fourth approach to improving performance in RAID systems includes cache configuration. For example, enabling read and write caching on the RAID controller or using battery-backed or flash-backed cache for data protection and faster cache flush operations. In one embodiment, monitoring RAID performance metrics will assist in identifying bottlenecks or areas for improvement. Monitoring tools analyzing drive I/O, throughput, latency, and other performance indicators can assist with evaluating performance metrics.

Figure 9:
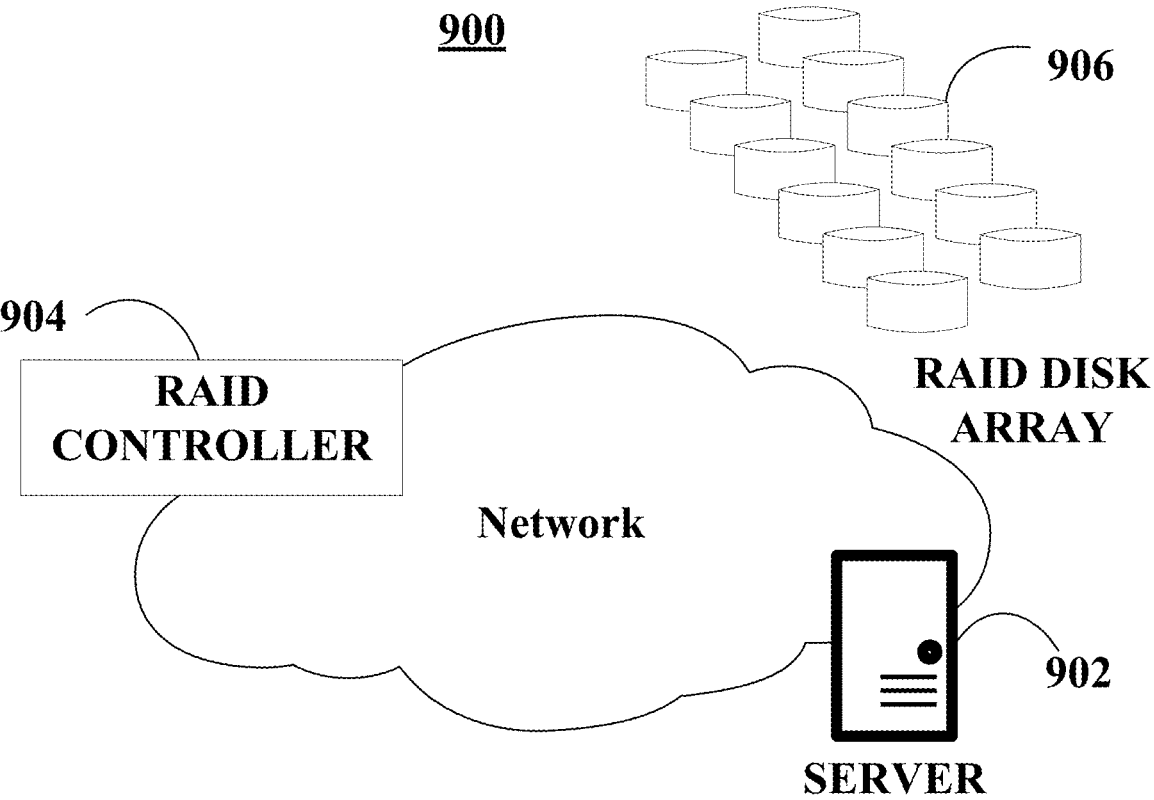
FIG. 9 illustrates a system diagram according to one embodiment of this invention.

FIG. 9 illustrates a network diagram. The network 900 illustrated in FIG. 9 includes a server 902, a RAID controller 904 and a RAID drive array 906. Networks 900 are commonly thought to comprise the interconnection and interoperation of clients, servers, and intermediary nodes in a graph topology. It should be noted that the term "server" 902 as used throughout this application refers generally to a computer, other device, program, or combination thereof that processes and responds to the requests of remote users across a communications network. Servers 902 serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A RAID controller 904 is typically embodied in a card or chip located between the operating system and a storage drive (usually a hard drive). The controller 904 may virtualize drives into different groups with specific data protection and redundancy features. The front-end interface typically communicates with the server through a host-based adapter (HBA). The backend communicates with and manages the underlying storage medium; it is usually NVMeOf, Infiniband, ATA, SCSI, SATA, SAS or Fibre Channel. RAID controllers may be classified by the multiple characteristics including drive types (such as SATA or SAS), specific RAID levels, and the number of ports and supported drives. A RAID drive array may refer to the physical grouping of drives that can be assigned to a RAID level. In one embodiment, a logical drive or virtual drive is a further subdividing of an array. In some embodiments, RAID controllers 904 are capable of multiple logical drives on a single array.

Any node may include a processor in communication with memory. Generally, any mechanization allowing a processor to affect the storage and/or retrieval of information is regarded as memory. Any number of memory embodiments may be employed in lieu of or in concert with one another. It is to be understood that a bus controller and/or a computer systemization may employ various forms of memory. For example, a computer system may be configured wherein the operation of on-chip CPU memory (e.g., registers), RAM, ROM. In a typical configuration, memory will include ROM, RAM, and a storage device. A storage device may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu Ray, CD ROM/RAM/Recordable (R)/ReWritable (RW), DVD R/RW, HD DVD R/RW etc.); RAM drives; non-transient memory, solid state memory devices (USB memory, solid state drives (SSD), etc.); other processor-readable storage mediums; and/or other devices of the like.

While the foregoing invention has been described in some detail for purposes of clarity and understanding, it will be appreciated by one skilled in the art, from a reading of the disclosure, that various changes in form and detail can be made without departing from the true scope of the invention.

The invention claimed is:

1. A method of encoding data for parity generation and data recovery in a redundant array of independent disks (RAID) storage system, comprising:

encoding data as elements of GF ($2^N$), each element comprising N bits;

storing the N bits of each GF ($2^N$) element non-contiguously in memory with a fixed stride equal to a processor word width in bits, wherein the processor word width is one of a scalar machine-word width and a SIMD vector-register width, thereby forming a bit-sliced representation of the data;

generating parity information for the RAID storage system by performing word-wise logical operations on N bit-planes of the bit-sliced representation using Galois-field arithmetic, wherein addition is implemented as bitwise XOR; and recovering stored data from the RAID storage system upon failure of at least one memory device of a plurality of memory devices using the generated parity information.

2. The method of encoding data of claim 1 wherein the scheme for the RAID is RAID 5.

3. The method of encoding data of claim 1 wherein the scheme for the RAID is RAID 6.

4. The method of encoding data of claim 1, further comprising:

splitting data into a plurality of Galois field elements by selecting bits in increments of n bits.

5. The method of encoding data of claim 1, further comprising:

calculating a plurality of GF($2^N$) field elements utilizing vector architecture of a plurality of central processing units.

6. The method of encoding data of claim 5, further comprising:

loading data onto a high-bit register associated with at least one of the plurality of central processing units;

splitting the data loaded onto the high-bit register into separate elements of the plurality of Galois field elements.

7. The method of claim 1, further comprising:

executing a vector multiplication operation by an element X when a step size N is equal to the bit depth of a high-bit register.

8. The method of claim 1, further comprising:

receiving recovery information regarding a status of the recovered stored data.

9. The method of claim 8, further comprising:

evaluating a performance metric with the recovery information received.

10. The method of claim 1, further comprising:

selecting a bit of an element of the plurality of Galois field elements in an increment equal to a bit depth of one element of a vector register.

\* \* \* \* \*